United States Patent [19]
Varsamis et al.

[11] Patent Number: 5,987,385
[45] Date of Patent: Nov. 16, 1999

[54] METHOD AND APPARATUS FOR CREATING AN IMAGE OF AN EARTH BOREHOLE OR A WELL CASING

[75] Inventors: Georgios L. Varsamis; Abbas Arian; Laurence T. Wisniewski, all of Houston, Tex.

[73] Assignee: Dresser Industries, Inc., Houston, Tex.

[21] Appl. No.: 09/154,910

[22] Filed: Sep. 17, 1998

Related U.S. Application Data

[63] Continuation-in-part of application No. 08/920,929, Aug. 29, 1997.

[51] Int. Cl.$^6$ ...................................................... G01V 1/40
[52] U.S. Cl. ................................................................ 702/6
[58] Field of Search .......................... 367/25, 27; 702/14, 702/6; 73/152.01

[56] References Cited

U.S. PATENT DOCUMENTS

| | | | |
|---|---|---|---|
| 4,590,593 | 5/1986 | Rodney | 367/83 |
| 4,599,904 | 7/1986 | Fontenot | 73/783 |
| 3,309,656 | 3/1967 | Godbey | 340/18 |
| 3,835,953 | 9/1974 | Summers | 367/27 |
| 3,982,606 | 9/1976 | Berry et al. | 181/102 |
| 4,153,815 | 5/1979 | Chaplin et al. | 381/71.9 |
| 4,215,425 | 7/1980 | Waggener | 367/83 |
| 4,665,511 | 5/1987 | Rodney et al. | 367/35 |
| 4,796,237 | 1/1989 | Hutchens et al. | 367/35 |
| 4,847,814 | 7/1989 | Angehrn | 367/72 |
| 4,872,526 | 10/1989 | Wignall et al. | 181/102 |

(List continued on next page.)

FOREIGN PATENT DOCUMENTS

| | | |
|---|---|---|
| 0 747 732 A2 | 12/1996 | European Pat. Off. . |
| 2 254 921 | 10/1992 | United Kingdom . |
| 2266372 | 10/1993 | United Kingdom . |
| 2300048 | 10/1996 | United Kingdom . |

OTHER PUBLICATIONS

J. Aron, et al: "Sonic Compressional Measurements while Drilling," SPWLA 35th Annual Logging Symposium, Jun. 19–22, pp. 1–17.
J. Minear, et al: "Compressional Slowness Measurements while Drilling," SPWLA 36 Annual Logging Symposium, Jun. 26–29, 2995, pp. 1–12.
C. Kimball et al: "Semblance processing of borehole acoustic array data." Geophysics, vol. 49, No. 3 Mar. 1984, pp. 274–281.
A.L. Kurjian, et al.: "Slowness estimation from sonic logging wave forms," Geoexploration, 27 (1991) pp. 215–256.
C. Morris, et al.: "A New Sonic Array Tool for Full Waveform Logging," SPE 13285 (Society of Petroleum Engineers of AIME), pp. 1–7.
Paper A, Transactions of the 30th SPWLA Annual Logging Symposium, Denver, 1989, "Field Experience using the Full Suite MWD–Combination for Reservoir Logging and Evaluation," K.H. Norre & H. Saether.

(List continued on next page.)

*Primary Examiner*—Christine K Koda
*Assistant Examiner*—Victor J. Taylor
*Attorney, Agent, or Firm*—Kammer & Huff, PLLC

[57] ABSTRACT

An acoustic logging tool, useful for creating a circumferential image of an earth borehole or well casing, which includes one or many acoustic transceivers mounted in substantially the same plane, in a drill string sub. The mounting receptacles are located in blocks, flexibly mounted in fixed inserts within the interior of the drill string sub. Each of the transceivers is structured to provide temperature and pressure compensation. The echo signals received by the transceivers are digitized and processed to eliminate extraneous noise created by the ringing of the transducers, by the signals reflected from the material backing the transducer ultrasonic element, and by any other sources inherent to the drilling environment. Digitization and further processing also allows for signal enhancement, thus allowing detection of signals in the presence of substantial noise. Temperature and pressure determinations are used to correct the acoustic velocity of the waves passing through the drilling fluid, "on-the-fly", as the drilling process continues.

2 Claims, 10 Drawing Sheets

U.S. PATENT DOCUMENTS

| | | | |
|---|---|---|---|
| 5,036,945 | 8/1991 | Hoyle et al. | 181/104 |
| 5,043,948 | 8/1991 | Hallmark et al. | 367/35 |
| 5,130,950 | 7/1992 | Orban et al. | 367/34 |
| 5,229,553 | 7/1993 | Lester et al. | 181/102 |
| 5,274,606 | 12/1993 | Drumheller et al. | 367/82 |
| 5,309,404 | 5/1994 | Kostek et al. | 367/31 |
| 5,317,111 | 5/1994 | Orban et al. | 181/105 |
| 5,341,345 | 8/1994 | Warner et al. | 367/99 |
| 5,357,481 | 10/1994 | Lester | 367/31 |
| 5,371,330 | 12/1994 | Winbow | 181/106 |
| 5,418,335 | 5/1995 | Winbow | 181/106 |
| 5,467,320 | 11/1995 | Maki | 367/40 |
| 5,469,736 | 11/1995 | Moake | 73/151 |
| 5,475,731 | 12/1995 | Rasmusson | 379/3 |
| 5,501,285 | 3/1996 | Lamine et al. | 175/27 |
| 5,510,582 | 4/1996 | Birchak et al. | 181/102 |
| 5,638,337 | 6/1997 | Priest | 367/27 |
| 5,639,997 | 6/1997 | Mallett | 181/102 |
| 5,644,186 | 7/1997 | Birchak et al. | 310/337 |
| 5,678,643 | 10/1997 | Robbins et al. | 175/45 |
| 5,724,308 | 3/1998 | Sorrells et al. | 367/34 |
| 5,737,277 | 4/1998 | Priest | 367/27 |
| 5,763,773 | 6/1998 | Birchak | 73/152.58 |
| 5,877,996 | 3/1999 | Krokstad et al. | 367/31 |

OTHER PUBLICATIONS

SPE Paper No. 20563, New Orleans, 1990, The Effect of Wellbore Conditions on Wireline and MWD Neutron Density Logs, by D.F. Allen, Best, M. Evans and J. Holenka.

SPE Paper No. 26494, Annual Techical Conference and Exhibition, "Standoff and Caliper Measurements whie Drilling Using a New Formation Evaluation Tool with 3 Ultrasonic Tranducers", by G.L. Moake, et al.

METHOD AND APPARATUS FOR CREATING AN IMAGE OF AN EARTH BOREHOLE OR A WELL CASING

RELATED APPLICATION

This application is a continuation-in-part of application Ser. No. 08/920,929, filed Aug. 29, 1997.

BACKGROUND OF THE INVENTION

1. Field of the Invention

The invention relates to an acoustic tool for creating an image of an earth borehole or well casing, and more particularly, to an imaging caliper instrument for use primarily in a measuring while drilling (MWD) environment utilizing acoustic pulses transmitted within a borehole.

2. History of the Prior Art

It has long been recognized in the oil and gas industry that the collection of downhole data during the drilling operation is of extreme value. Such information improves the efficiency of the drilling operation by providing critical data concerning downhole conditions. For example, it is desirable that a continuous record of borehole size be provided so that variations in borehole diameter as a function of depth may be recorded for analysis in connection with other measurements of formation parameters.

Acoustic well logging is also used in the geophysical and seismic arts to provide surveys of the various formations traversed by the borehole. In particular, acoustic velocity measurements provide valuable information concerning the type of rocks and the porosity thereof in the formation surrounding the borehole. The most commonly measured acoustic parameter in the field of well logging has been the velocity of compression waves. The velocity of shear waves and acoustic impedance have also been of value in determination of both the formation characteristics and the fluid environment.

A myriad of acoustic logging systems for downhole measurements are available in the prior art. One of the most critical measurement parameters of such acoustic logging systems is the acoustic velocity in the fluid through which the acoustic pulse is transmitted. A high degree of accuracy in the interpretation of pulse data is only possible with a precise knowledge of the acoustic velocity in the medium of measurement. Moreover, a high degree of resolution and/or accuracy in acoustic velocity measurements is necessary for the accurate identification of various formation strata as well as other critical borehole parameters.

Many prior art attempts to provide accurate acoustic logging instrumentation have encountered serious problems due to the downhole environment. For example, the drilling operation necessitates the flow of high pressure drilling mud which is pumped down through a central bore in the drill pipe, out through apertures in the drill bit and back to the surface through the annular space between the drill pipe and the side walls of the borehole. The mud removes drill bit cuttings and the like and can reveal much information about the formation itself. Such a fluid system, by definition, includes wide variations in drilling mud density and character both along the borehole as well as in a direction across the borehole annulus. For example, gas present in the drilling fluid has a direct bearing on acoustic velocity within the fluid and the presence of gas varies with position and pressure within the borehole.

One prior art technique of determining acoustic velocity includes sampling the drilling mud at the wellhead for purposes of measurement. However, such a measurement cannot accurately reflect the varying conditions of the mud downhole where the acoustic measurements are actually made. Downhole acoustic pulses are generated, generally, by acoustic transducers disposed within the side walls of a sub secured above an operating drill bit within the borehole. The acoustic pulses are transmitted from the sub to the sidewalls of the borehole through the drilling fluid and the reflection time thereof is monitored. The presence of gas or cuttings within the fluid as well as downhole pressures, temperature and turbulence thus has a direct bearing on the acoustic velocity and the pulse-echo amplitude or reflectivity measurements. However, the most convenient location for measuring acoustic velocity is at the wellhead in the passive fluid collection area where the dynamic turbulent downhole conditions are not present. In addition, once received from the borehole, the drilling mud is generally allowed to settle and/or is passed through an out-gassing unit prior to its collection and recirculation. This step drastically alters the acoustic velocity parameters of the drilling fluid from its downhole gaseous and turbulent condition and leads to inaccuracies in the interpretation of the downhole acoustic reflectivity measurements.

A prior art method of overcoming the problems of accurate data collection in a measuring-while-drilling (MWD) environment is the recording of acoustic borehole measurements with a wireline logging tool. Such tools are utilized with the drill string removed from the borehole and the drilling mud being in a settled state. Such a condition lends itself to a more homogeneous configuration and the presence of mud cakes and turbulence related to nonhomogeneous regions are generally eliminated. One such acoustic caliper logging device is set forth and shown in U.S. Pat. No. 3,835,953 to Summers wherein a wire line tool is provided for positioning within a borehole. A transducer unit repeatedly generates an acoustic pulse as the transducer system is rotated to scan the walls of the borehole in a full circle. A scan of between 1 and 10 revolutions per second may be provided with the tool itself being generally centered within the borehole. The reflections of acoustic energy from the borehole wall are then from a small, centralized area whereby the system can be highly definitive of the character of the wall. Such information is obviously useful in an analysis of the borehole configuration. One distinct disadvantage is, however, the necessity of pulling the drill string from the borehole for utilization of the wireline tool. This operation is both time consuming and expensive from the standpoint of the drilling operation.

In addition, prior art downhole acoustic parameter measurement techniques have obtained acoustic velocity at a downhole location but the acoustic path over which the velocity measurements are made is different from the path over which the parameter of interest is measured. For example, an acoustic caliper measurement made across a borehole annulus which relies on acoustic velocity data obtained in a direction parallel to the borehole axis will not be precise because of the nonlinearity of the flow pattern and flow densities across the borehole.

It would be an advantage, therefore, to overcome the problems of the prior art by providing detailed acoustic caliper information of a borehole in a measuring while drilling configuration. This gives the driller immediate feedback as to the quality of the borehole being drilled and can be used to infer in situ stresses, for example, as disclosed in U.S. Pat. No. 4,599,904 to John E. Fontenot, assigned to Baroid Technology, Inc., the assignee of this present application. This patent discloses that the calipering operation itself can be accomplished through the use of any conventional calipering device, e.g., mechanical, acoustic or neutron calipering device.

Another approach to providing MWD caliper measurements of the drilled borehole is disclosed in U.S. Pat. No. 4,665,511 to Paul F. Rodney et al., also assigned to Baroid Technology, Inc., the assignee of the present application. This patent discloses a downhole, MWD logging tool in which a plurality of acoustic transceivers are placed on the tool in both azimuthal and longitudinal spacings to provide not only a measurement of the acoustic energy reflected from the borehole wall, but also a measurement of the drilling fluid acoustic velocity, coupled with an inclinometer to determine one period of rotational data for purposes of analysis. The patent suggests that the tool can be used to measure the dimensions and shape of the drilled borehole.

The prior art also includes U.S. Pat. No. 5,130,950 which discloses a pulse echo apparatus for measuring borehole standoff and borehole diameter in an MWD environment, and includes deformable material such as rubber inside the acoustic sensor stack to allow the sensor stack to move or deform under pressure or due to thermal expansion or contraction.

As additional prior art, U.K. Patent Appln. No. GB 2 254 921 A discloses means for pressure equalization in an MWD acoustic borehole caliper device.

The prior art also discloses in U.S. Pat. No. 5,341,345 an MWD, ultrasonic stand-off gauge for use in measuring the instantaneous stand-off distance between the drill stem and the borehole wall during drilling.

As additional prior art, U.S. Pat. No. 5,469,736 discloses an MWD, acoustic caliper tool which derives a caliper measurement based on an analog threshold technique.

European Patent Appln. No. 0 747 732 A2, and also U.S. Pat. No. 5,644,186 disclose an MWD, acoustic caliper tool having a movable seal assembly intended to provide temperature and pressure compensation.

Another field of acoustic logging includes the wireline acoustic borehole scanning tool, commonly referred to as a borehole televiewer, which permits the wall of the borehole or casing to be scanned in a manner that produces a visual image of the borehole or casing wall. Acoustic pulses are emitted from an acoustic transducer functioning as a transmitter, which pulses travel to the periphery of the borehole wall, where they are reflected as echo pulses back to the transducer functioning as a receiver. The received acoustic echo pulses are used to generate a visual image of the borehole or casing wall.

Imaging systems, such as the borehole televiewer tool, can provide information to assist in the description of the subsurface reservoir. Such applications include: fracture identification, stratagraphic interpretation, and thin bed analysis. This ability is based on variations in lithology, rock physical features and borehole geometry, that cause changes in the measured travel time and amplitude of the acoustic reflected signal. This signal information is utilized to provide an image of the earth borehole wall. Inside casing such changes can be used to monitor the casing for internal corrosion or damage caused by the drilling operation. The resulting images can be displayed on a high resolution color monitor and/or may be plotted.

Borehole televiewer systems operating on wireline are well known. One such system is described in U.S. Pat. No. 3,369,626 to Zemanek, wherein the wall of the borehole is scanned periodically with acoustic energy. A single transducer, functioning as both a transmitter and a receiver, is rotated and periodically actuated to produce acoustic pulses which are reflected back off the wall of the borehole. The travel times of the echo pulses are utilized to create a beam sweep, once for each rotation of the transducer, to create an image of the wall of the borehole.

Over the years the prior art reflects numerous improvements to the basic wireline borehole televiewer. U.S. Pat. No. 4,736,348 describes a borehole televiewer wherein the received reflected acoustic signals are corrected for amplitude modulation resulting from oblique angles of incidence of the transmitted acoustic pulses when the tool is off center in the borehole, is in an eliptical borehole, or is tilted from the vertical axis of the borehole. The corrected reflection signals modulate an image display so that the full circumference of the borehole can be delineated.

U.S. Pat. No. 4,837,753 describes a wireline borehole televiewer tool where the transducer is rotated using a stepper motor. A computer synchronizes the number of transducer pulses with the number of stepper motor pulses thereby generating a constant number of transducer pulses per motor revolution. Reflected acoustic energy generates an electrical pulse which is amplified and summed, with the summed signal used to create an image of the borehole.

U.S. Pat. No. 4,774,573 describes a wireline borehole scanning apparatus where the downhole tool generates a signal related to magnetic north. Using digital processing techniques, the peak value of each detected acoustic pulse and the signal related to magnetic north are used for generating a video display.

U.S. Pat. Nos. 4,847,814 and 5,043,948 describe improved systems for creating an image of the borehole wall using the transit times and the amplitudes of the reflected acoustic echo pulses.

OBJECTS OF THE INVENTION

The primary object of the present invention is to provide new and improved methods and apparatus for determining, during a drilling operation, an approximation to the borehole shape and the borehole dimensions as the borehole is drilled through various sub-surface earth formations.

Another object of the present invention is to provide new and improved methods and apparatus for creating an image of the earth borehole or well casing.

Still another object of the present invention is to provide new and improved methods and apparatus for creating an image of the borehole during a drilling operation.

Yet another object of the present invention is to provide new and improved methods and apparatus for determining, during a drilling operation, the ellipticity of the borehole and the directions of the minor/major axes of the elliptical borehole relative to that of Magnetic North and to the earth's gravity.

Another object of the present invention is to provide new and improved acoustic transducers having temperature and pressure compensation and methods of mounting such transducers in MWD logging tools.

Still another object of the present invention is to provide new and improved methods and apparatus for digitizing the various acoustic signals and for processing such signals to improve the accuracy of the borehole size and borehole shape determinations and the capacity of the borehole image.

Another object of the present invention is to provide new and improved methods and apparatus for digitizing the various acoustic signals and for processing such signals to improve the echo detection reliability and extend the operating range of acoustic caliper logging systems.

Yet another object of the present invention is to provide new and improved methods and apparatus enabling the acoustic caliper logging system to provide drilling fluid acoustic velocity corrections on the fly, i.e., as the well is being drilled.

SUMMARY OF THE INVENTION

The objects of the invention are accomplished, generally, by new and improved methods and apparatus which generate ultrasonic pulses in an earth borehole, which then measure the return of such ultrasonic pulses as they are reflected off the wall of the earth formations surrounding the earth borehole, which digitize such reflected ultrasonic pulses, and which then process such digitized pulses to minimize the effects of ultrasonic transducer ringing.

As another feature of the invention, the ultrasonic pulses are transmitted from a plurality of transducers, with the transmitted signal from said transducers being digitized, computed and utilized to improve the representation of the received echo signals by Digital Signal Processing methods.

As yet another feature of the invention, in which an appropriate element such as a piezoelectric crystal is used to generate ultrasonic pulses, a profile is generated of the signal reflection from the backing material behind the ultrasonic element, and the generated profile is utilized to improve the representation of the received echo signals by Digital Signal Processing methods.

Another feature of the present invention is the provision of new and improved methods and apparatus for creating an image of the borehole, by more accurately measuring the amplitude of the reflected acoustic pulse wall signal.

Yet another feature of the invention is correction of the travel time and amplitude of the reflected signal for factors including but not limited to; pressure, temperature, tool eccentricity and general tool motion.

Another feature of the present invention relates to a new and improved ultrasonic transducer having temperature and pressure compensation, and to methods and apparatus for mounting such transducers in an MWD sub intended to be incorporated in a drill string.

DETAILED DESCRIPTION OF THE PREFERRED EMBODIMENT

Figure 1:
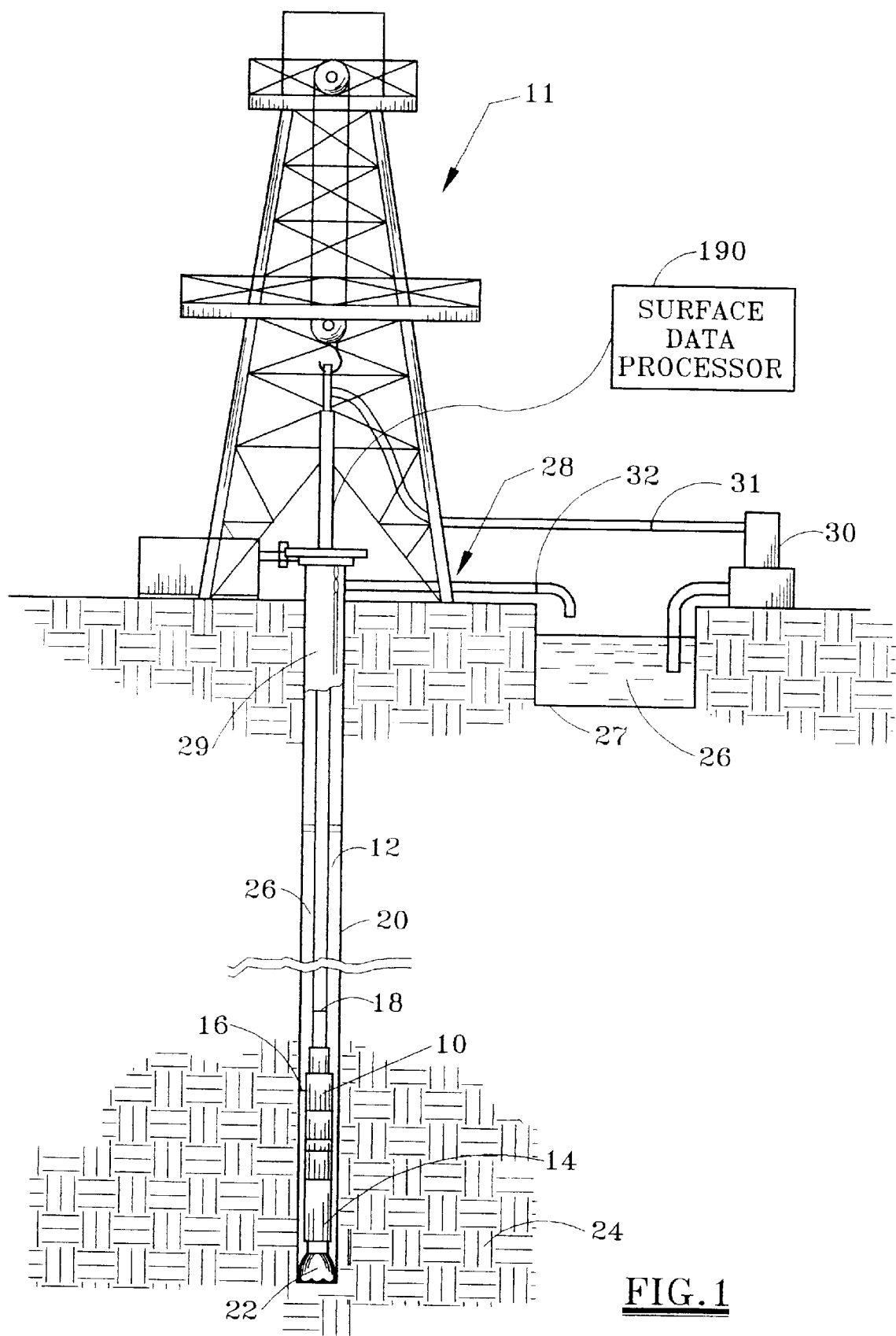
FIG. 1 is a diagrammic, side elevational view of a borehole drilling operation illustrating the use of an acoustic caliper apparatus in accord with the present invention.

As discussed below with respect to the prior art, there is a constant need for new and improved MWD caliper tools, as discussed, for example, in Paper A, Transactions of the 30th SPWLA Annual Logging Symposium, Denver, 1989, "Field Experience Using the Full Suite MWD-Combination for Reservoir Logging and Evaluation", presented by K. H. Norre and H. Saether. Also, such a need is discussed in SPE Paper No. 20563, New Orleans, 1990, "The Effect of Wellbore Conditions on Wireline and MWD Neutron Density Logs", presented by D. F. Allen, D. D. Best, M. Evans and J. Holenka.

One of the key uses of a caliper tool is for correction of the logging measurements of other FEWD (Formation Evaluation While Drilling) type sensors. These might include the gamma ray, resistivity, neutron, and other acoustic type sensors. Understanding and verifying the effects of washouts on the sensors offers a key quality control mechanism.

Another use of an MWD caliper tool is to offer a method of calculating cement volumes. On a final bit run, an MWD tool can be triggered to collect data while tripping out of the hole to offer accurate cement volume calculations.

Other applications of an MWD caliper tool include real-time assessment of well bore stability, evaluation of hole cleaning, and determination of tight spots or formation ledges, and borehole or well casing imaging. With the addition of "dynamic" directional sensors, borehole geometry (ellipticity) can also be computed. Borehole ellipticity is sometimes used to estimate the maximum horizontal stress field for reservoir calculations, for example, as discussed above with respect to U.S. Pat. No. 4,599,904.

A need has also been established for an accurate, highly reliable standalone MWD caliper tool which can be run independent of other expensive MWD sensors. The ability to make measurements over a relatively large operating range is considered a key requirement for fielding a commercially successful tool.

Some of the requirements identified as critical to the success of an MWD caliper tool include: operation at elevated temperature, high shock and vibration environment; industry standard connection configuration capable of accommodating industry standard radii of curvature under rotation and/or bending; a power source; read out capabilities; internal processor, data storage memory, communications hardware; and finally, a transceiver design that allows for reliable operation at elevated pressures and temperatures.

Theory of Operation

The tool physics behind the measurement is quite simple. Based on the pulse-echo technique the standoff from the borehole wall can be calculated by the equation:

$$\delta = \frac{v_m t}{2} \quad (1)$$

with δ the standoff, $v_m$ the mud acoustic velocity, and t the round-trip time (time difference between pulse emission and echo arrival, or equivalently time difference between transmitter firing and echo detection of the borehole wall signal). Note that for equation (1) the standoff is assumed to include contributions from delay lines, transducer packaging material, etc. All of these need to be taken into account when the actual standoff is calculated, i.e. the distance from the "diameter" of the tool at the transducer, to the borehole wall.

In theoretical terms, when a tool of diameter $D_t$ is centered in a borehole of diameter $D_h$, the hole diameter can be estimated (with the use of δ from equation 1) by the equation:

$$D_h = D_t + 2\delta$$

Unfortunately in a drilling environment, a bottom hole assembly (BHA) reacts much differently. The tool is seldom centered in the borehole, thus the value of δ will vary with time. In addition, the borehole is seldom a clean circle, thus the value of $D_h$ (and δ) will vary with the orientation of the transducer and the actual size of the borehole. It is for these reasons that multiple transducers, geometric calculations and averaging techniques must be utilized. The result is an average hole diameter, that represents the diameter of an equivalent circle with approximately the same area as the area of the true borehole that is calculated downhole.

The error in the standoff as well as the borehole diameter can be calculated by standard mathematical and statistical means applied to equations (1) and (2). When arrival time can be estimated accurately, the dominant error factor for the borehole calculation becomes the fractional error in mud acoustic velocity. It is well known to those skilled in the art, that the mud acoustic velocity changes with mud-type and density, mud salinity, pressure, temperature, and finally with the amount/presence of gas dissolved in the mud. Recognizing the potentially dominant effect of changes in the mud acoustic velocity, one needs to construct a set of experiments to characterize/measure the mud acoustic velocity versus most of the significant factors that influence it. The result then is a set of data, as well as a set of semi-empirical equations that allow for "on-the-fly" corrections to the caliper value. The corrections can either be applied downhole or the downhole data can be reprocessed at the surface once the data is retrieved from the downhole tool.

The error in round-trip time can become significant if the true zero-crossing equivalent of the echo signal is missed or estimated at the wrong time. Published sampling techniques (for downhole acoustic calipers) rely on analog signal manipulation (filtering and rectification or comparator-based time sampling). When purely analog techniques are utilized for timing measurements, the probability of detection error for the first arrival increases dramatically, and the error in the round-trip time can become another significant error factor in the caliper calculation. For example, the variation in the detection of the first arrival (for a tool based on analog detection techniques) is around 3 microseconds (a standoff error of about 0.09 inches in water), as discussed in SPE Paper No. 26494, Annual Technical Conference and Exhibition, "Standoff and Caliper Measurements While Drilling Using a New Formation Evaluation Tool with Three Ultrasonic Transducers", presented by G. L. Moake, J. R. Birchak, R. G. Matthews and W. E. Schultz. For a tool constructed in accordance with the present invention, the variation in the detection of the first arrival (using digitization of the signal, Digital Signal Processing and "true-zero-crossing" techniques) is as little as fractions of a microsecond (a standoff error of a few thousandths of an inch in water or a factor of many times smaller).

In one of the preferred embodiments according to the present invention, the tool uses a fast Analog-to-Digital converter to digitize the acoustic signal. Determination of the first arrival is accomplished by Digital Signal Processing, thus minimizing the error associated with analog signal manipulation. Multiple samples are taken per rotation to provide an average borehole diameter and to allow for proper determination of the approximate shape of the borehole.

The existence of digitized signals offers a distinct advantage to the tool according to the present invention. Digital Signal Processing techniques are utilized to enhance the capability of echo detection, even in the presence of significant signal attenuation (larger standoffs, heavy muds etc.), thus resulting to an increased standoff detection capability over prior art, even in heavy mud (16 to 18 ppg). In addition, Digital Signal Processing can eliminate proximity effects (no "delay-line" required), as well as calculate an accurate borehole diameter in the presence of drilling cuttings and/or small concentrations of gas.

There are generally two "errors" associated with a caliper tool: first, the repeatability error, i.e. the capability of the tool to consistently measure a "fixed" borehole. For a preferred embodiment constructed in accordance with the principles of the present invention the average repeatability error is in the order of 0.02 inches or lower, over most of the operating range. In fact in many cases, when the tool was relatively centralized the repeatability error was less than 0.005 inches. For comparison, prior art quotes repeatability errors from 0.05 inches to 0.2 inches.

The second error is the accuracy of the measurement, i.e. the capability of the tool to precisely measure a borehole. For a preferred embodiment constructed in accordance with the principles of the present invention and with the use of circular boreholes (where the diameter is known) the average accuracy error is less than 0.03 inches extending over most of the operating range of the tool.

Referring now specifically to the drawings, and first to FIG. 1, there is shown a drilling rig 11 disposed atop a borehole 12. A first embodiment of an acoustic caliper tool 10 constructed in accordance with the principles of the present invention is carried by a sub 14, typically a drill collar, incorporated into a drill string 18 and disposed within the borehole 12. The system 10 is provided for the continuous measurement of acoustic velocity, reflected signal amplitude and distance within the annular region 16 defined between the sub 14 and the borehole sidewalls 20. A drill bit 22 is located at the lower end of the drill string 18 and carves a borehole 12 through the earth formations 24. Drilling mud 26 is pumped from a storage reservoir pit 27 near the wellhead 28, down an axial passageway 54 (see FIG. 3) through the drill string 18, out of apertures in the bit 22 and back to the surface through the annular region 16. Metal casing 29 is positioned in the borehole 12 above the drill bit 22 for maintaining the integrity of the upper portion of the borehole 12.

Still referring to FIG. 1, the annular 16 between the drill stem 18, sub 14 and the sidewalls 20 of the borehole 12 forms the return flowpath for the drilling mud. Mud is pumped from the storage pit 26 near the well head 28 by a pumping system 30. The mud travels through a mud supply line 31 which is coupled to a central passageway extending throughout the length of the drill string 18 (and 54 when referring to FIG. 3). Drilling mud is, in this manner, forced down the drill string 18 and exits into the borehole through apertures in the drill bit 22 for cooling and lubricating the drill bit and carrying the formation cuttings produced during the drilling operation back to the surface. A fluid exhaust conduit 32 is connected from the annular passageway 16 at the well head for conducting the return mud flow from the borehole 12 to the mud pit 26 as shown in FIG. 1. The drilling mud is typically handled and treated by various apparatus (not shown) such as outgassing units and circulation tanks for maintaining a preselected mud viscosity and consistency. It may be seen that measurements of acoustic velocity of the drilling mud at or within the drilling pit 26 would thus be affected by the treated and stagnant condition of the mud.

The position of the acoustic caliper tool 10 upon the drill sub 14 relative to the borehole walls 20 will vary during rotation. The drill string 18 may be rotated for imparting the requisite cutting action to the drill bit 22 and, during rotation, the drill string 18 often rubs against the walls of the borehole 12. Such rubbing results in misalignments and the non-centralized positioning of the acoustic caliper tool 10 relative to the borehole walls 20. The measurement of distances with the tool 10 by means of acoustic pulses which are reflected from the borehole walls 20 must therefore be extremely precise in order to produce data which accurately depicts the dimensions and shape of the borehole. This precision of measurement must also be maintained in view of the presence of gas, formation cuttings and non-homogeneous fluid flow conditions as is typical in most drilling operations. Moreover, dimensions of non-uniform borehole cross-sections must be measured as well as the variations in acoustic reflectivity which are indicative of different formation materials.

The method and apparatus of the present invention provide a system capable of producing data of an accurate and reliable nature indicative of borehole shape, size and image features by utilizing a common acoustic pulse for both the determination of acoustic velocity within the turbulent flow of non-homogeneous drilling fluid in the borehole annular as well as the distance between the sub 10 and the borehole wall 20 and the amplitude of the reflected signal. In this manner, all distance measurements will utilize the actual acoustic velocity of the fluid medium through which the distance measurements are made.

Figure 2:
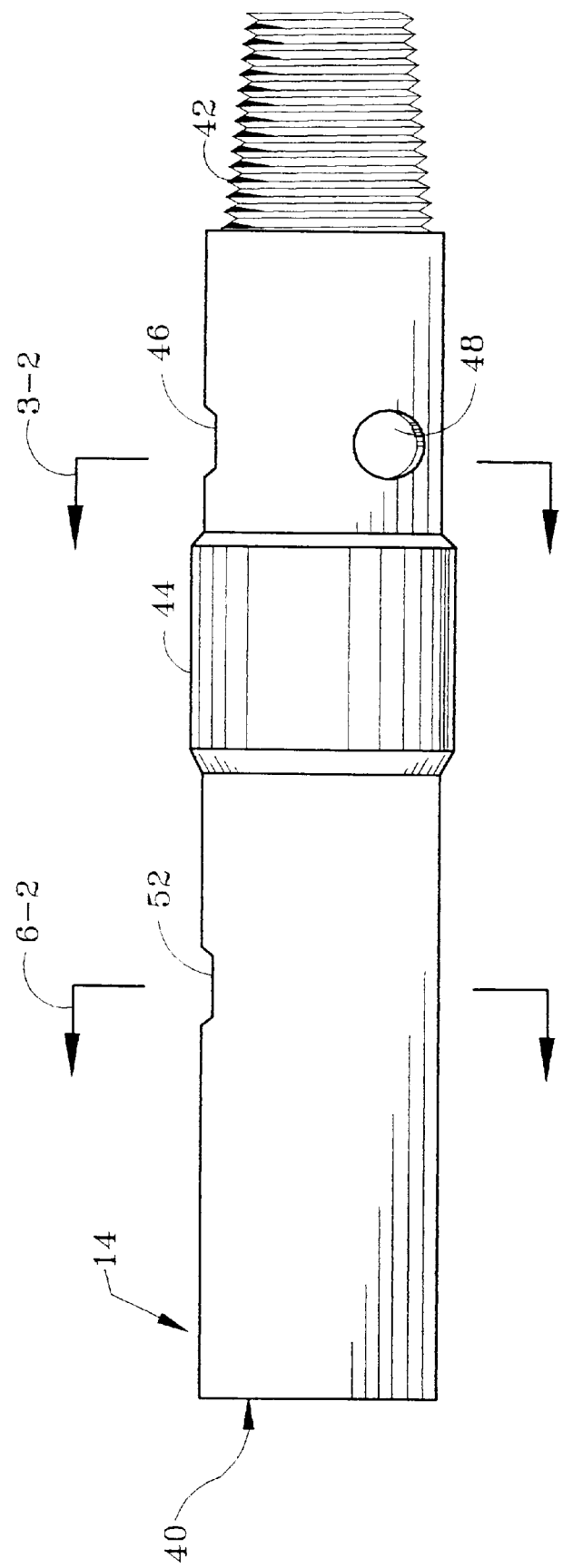
FIG. 2 is an elevated, pictorial view of a sub, typically a drill collar, incorporating the ultrasonic caliper apparatus according to the present invention, and configured to be incorporated in a drill string.
Figure 3:
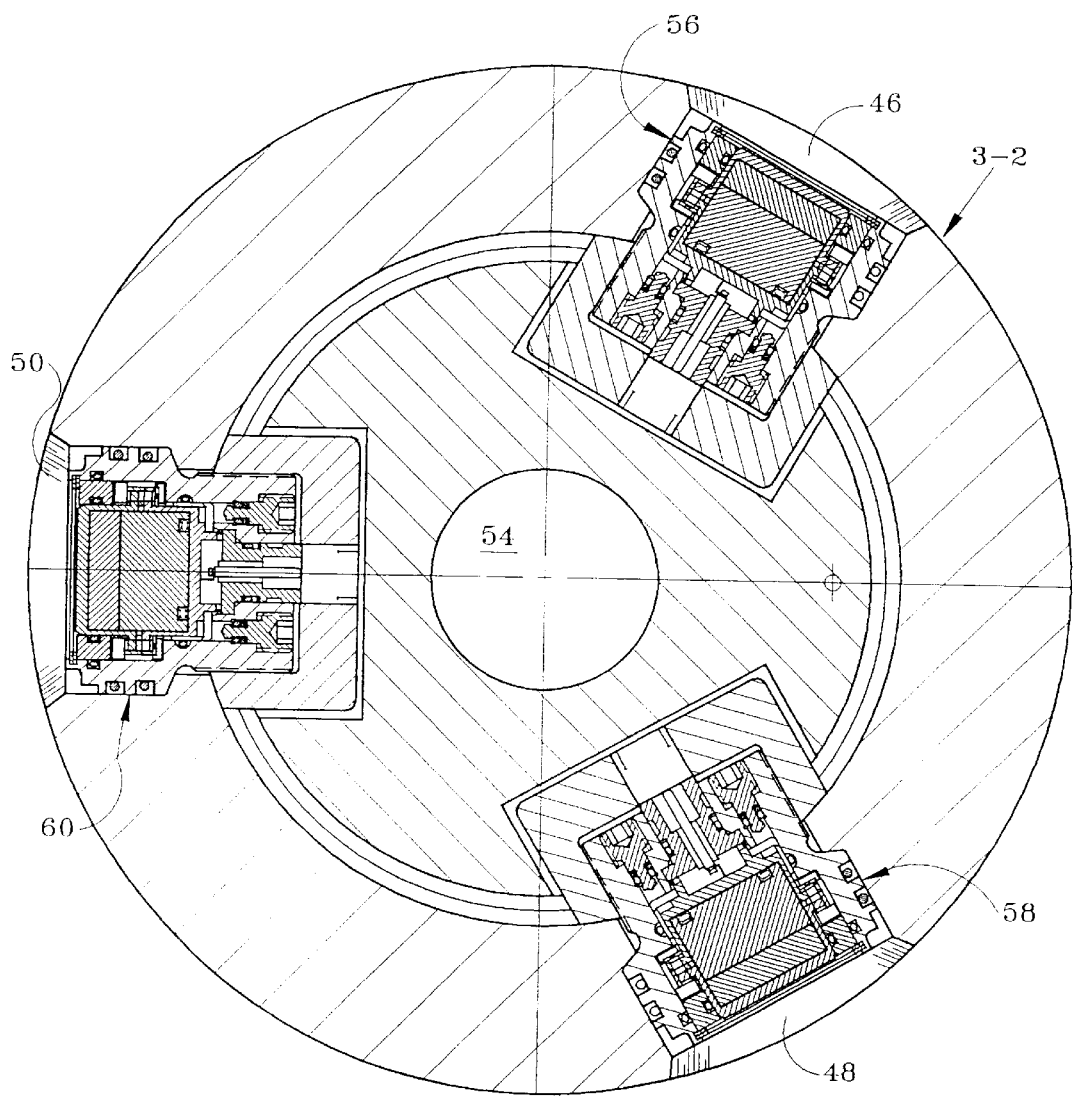
FIG. 3 is a cross-sectional view taken through the sub illustrated in FIG. 2 and taken along the sectional line 3-2 thereof.

FIG. 2 illustrates in pictorial form the sub 14 incorporated into the drill string 18 illustrated in FIG. 1. The sub 14 preferably has a box end 40 and a pin end 42 for threadedly engaging the other sections of the drill string 18. A wearband 44, having a circumference slightly larger than the circumference of the sub 14 itself, is surfaced with hard-facing, for example, tungsten carbide, and is positioned in near proximity to the transducers to protect the acoustic transducers positioned in the three circular holes 46, 48 and 50, with only the holes 46 and 48 illustrated in FIG. 2. Although wear pad 44 is illustrated as being cylindrically shaped, it can also take other forms, for example, such as three longitudinal pads positioned on the periphery of the sub 14, 120°, apart to coincide with the positioning of the transducers in the holes 46, 48 and 50. A port 52 is also provided in the exterior wall of the sub 14 to access any data stored in a recorder within the sub 14, in a manner well-known in the art, when the drill string 18 is retrieved back to the earth's surface. FIG. 3, described hereinafter, correlates with the section line 3-2 illustrated in FIG. 2.

Referring now to FIG. 3, the view taken along the sectional line 3-2 of FIG. 2, is illustrated as having three circular holes 46, 48 and 50 in the sub 14 and having threadedly engaged therein, three transducers 56, 58 and 60, respectively, 120° apart. There is also illustrated the axial passageway 54 through which the drilling fluid passes. The transducers 46, 48 and 50 are identical, with transducer 46 illustrated and described in more detail in FIGS. 4(a) and 4(b).

Figure 4A:
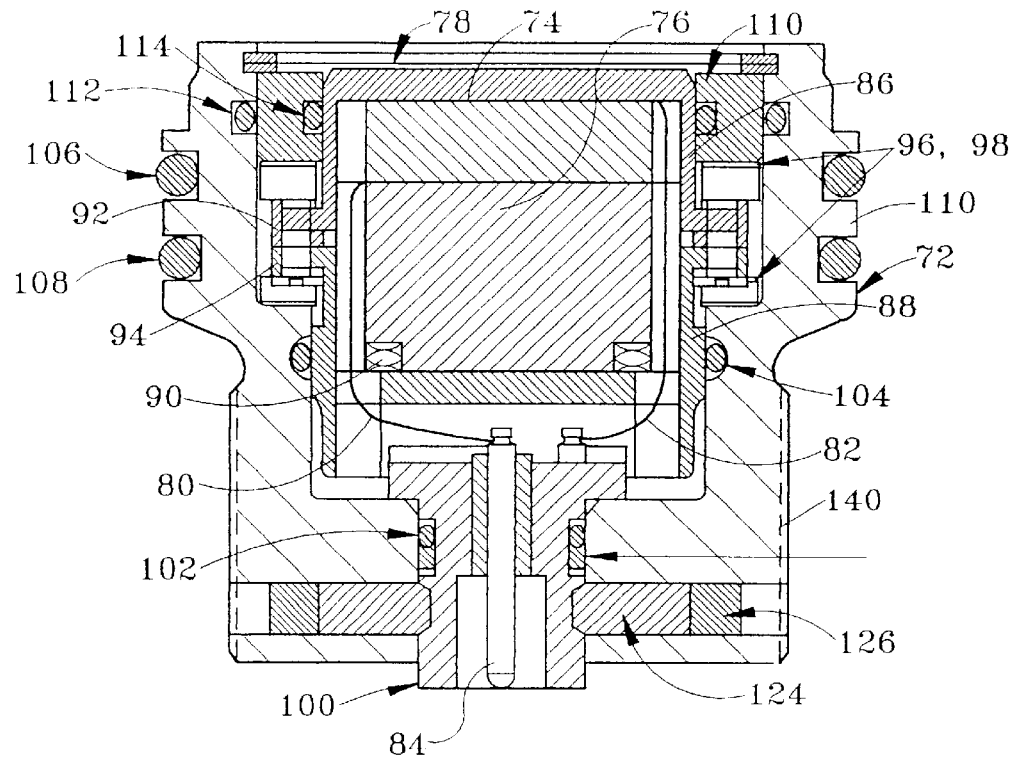
FIG. 4(a) is an elevated view, partly in cross-section, of an ultrasonic transducer according to the present invention.
Figure 5:
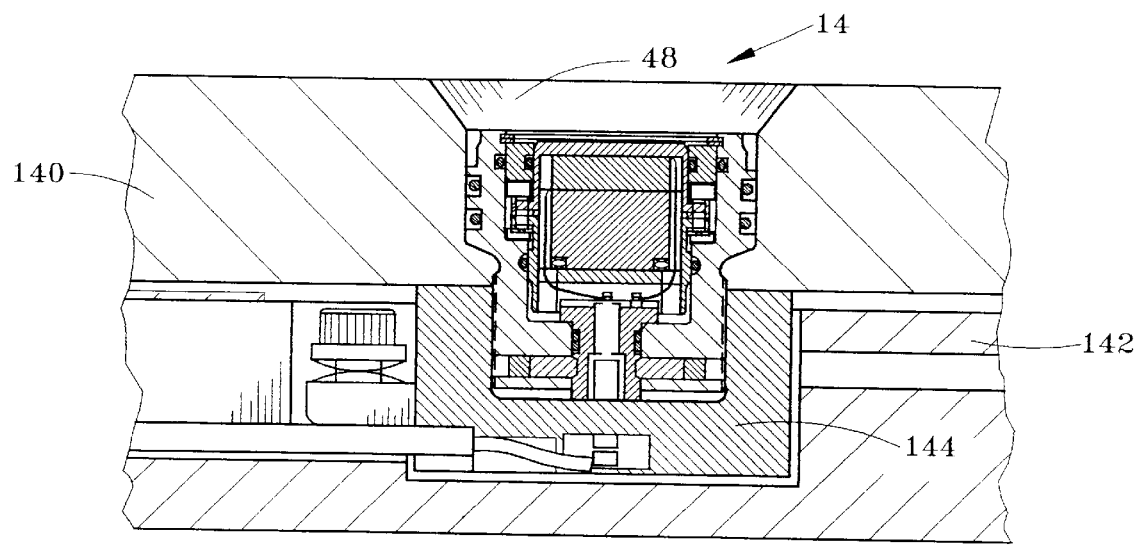
FIG. 5 is an elevated view, partly in cross-section, of an ultrasonic transducer mounted within a sub in accord with the present invention.

Referring now to FIG. 4(a), the transducer 46 comprises a main body 72, having male threaded connections for threading the sensor 46 into a female threaded receptacle in the sub 14, as illustrated in FIG. 5. The main body 72 has an internal cavity for housing an ultrasonic element 74 and a backing assembly 76, together being an ultrasonic element/backing assembly 78. The upper end of the main body 72 is hexagonally shaped to allow a wrench to tighten the transducer into a threaded receptacle. The material used in the backing assembly 76 can be any material which dampens or absorbs the unwanted ultrasonic signals emitting out of the back of the ultrasonic element 74, but preferably includes a mixture of tungsten powder and elastomer or epoxy material. Electrical connectors 80 and 82 are connected across the ultrasonic element 74. The ultrasonic element and ultrasonic element backing and the electrical connections 80 and 82 are hermetically sealed within the internal cavity of the main body 72 against the hydrostatic pressure within the earth borehole resulting from the weight of the column of drilling fluid. The electrical connector 80 is tied to a feedthru element 84, whereas the electrical connector 82 is connected to the main body of the electrical connector 100 and also to the main housing 72 through set-screws 124, and locking screws 126 to establish a ground connection.

The ultrasonic element and backing sub-assembly 78 containing the ultrasonic element 74 and the backing material 76 are enclosed within a pair of thermoplastic housings 86 and 88, preferably formed using "PEEK" (poly-ether-ether-keton) or a similar thermoplastic or thermoset material. The ultrasonic element 74 is adhered to the backing material 76 using a highly flexible adhesive material. The ultrasonic element 74 and the backing material are adhered to the top housing 86 using the same or similar adhesive material. The upper housing 86 is attached to the lower housing 88 using a plurality of bolts or screws through their respective abutting flanges 92 and 94. A pair of wave springs 96 and 98 encircle the upper and lower housings 86 and 88, respectively, and ride against the housing flanges 92 and 94, respectively. The spring 90 maintains a compressive preload between the ultrasonic element 74 and the backing material 76 against axial shock and vibration of the downhole environment when the housings 86 and 88 are bolted together. The wave springs 96 and 98, riding against the flanges 92 and 94, respectively, cause the ultrasonic element/backing sub-assembly to be in a null position, and also allow the sub-assembly to be preloaded to enable the sub-assembly to withstand handling, tripping in and out of the borehole, and the drilling conditions themselves. An increase of temperatures and pressures, usually a result of drilling deeper into the earth formations, causes an increase in the preload and thus an increased resistance to drilling shock and vibration.

The electrical connector assembly 100, housing the electrical feedthru element 84, uses an O-ring 102 with backup ring 103 to seal against the internal diameter of the main body 72, thus sealing the high compensation fluid pressure. An O-ring 104 between the main body 72 and the lower housing 88 helps to centralize the ultrasonic element/backing assembly in the lateral direction. A pair of O-rings 106 and 108 in the external sidewall portion 110 of the main body 72 provide a static seal to withstand the extremely high differential pressure between the wellbore fluid and the atmospheric conditions inside the sub 104.

Figure 4B:
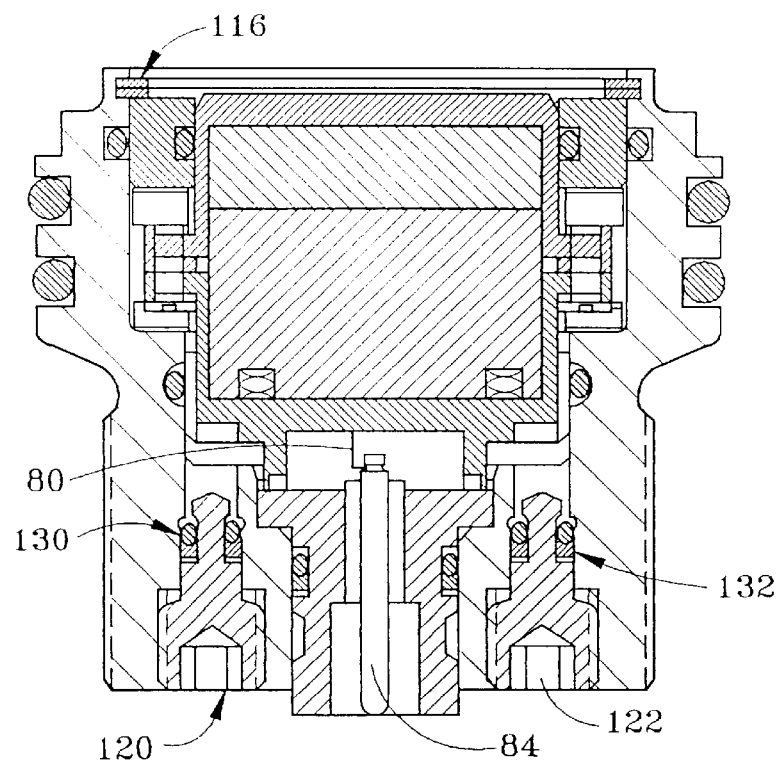
FIG. 4(b) is an elevated view, partly in cross-section, of the transducer illustrated in FIG. 4(a), but rotated 90°.

A piston 110, exposed to the wellbore fluid, is positioned in the annular spacing between the upper housing 86 and the main body 72, and is held against the housing 86 using a retaining ring 116 illustrated in FIG. 4(b). An O-ring 112 is positioned between the main body 72 and the piston 110. An O-ring 114 is positioned between the piston 110 and the upper housing 86. The O-rings 112 and 114 separate the internal oil, i.e., the compensation fluid, from the external borehole fluid.

The electrical connector assembly 100 is held in place within the main body 72 through the use of a pair of set screws 124 and a pair of locking screws 126 used also for a signal return connection.

Referring now to FIG. 4(b), merely being rotated 90° from FIG. 4(a), a pair of ports 120 and 122 are used to add compensation fluid, which can be any suitable oil which typically increases in volume with increases in temperature. In the assembly of the device illustrated in FIGS. 4(a) and 4(b), the inside of the main body 72 is first evacuated and then filled with a pressure compensation fluid through the ports 120 and 122. The ports 120 and 122 are both fitted with high pressure O-rings 130 and backup rings 132.

In the operation of the device illustrated in FIGS. 4(a) and 4(b), the oil volume within the interior of the main body 72 expands and contracts with changes in the ambient pressure and temperature conditions. Upon increase in the interior oil volume due to temperature, the ultrasonic element/backing assembly acts as a piston unit and moves outward towards the borehole annulus, thus expanding the interior oil volume. If however, the interior oil volume is contracted due to an increase in hydrostatic pressure, the piston 110 and the ultrasonic element/backing assembly will move inwardly, away from the borehole annulus, as a compensating piston to reduce the interior oil volume. Adequate amounts of electrical lead wire lengths and strain relief is provided to allow for movement of the ultrasonic element/backing sub-assembly for temperature/pressure compensation motion between the ultrasonic element/backing assembly and the electrical connector assembly 100.

Referring now to FIG. 5, there is illustrated a preferred apparatus for mounting the transducer of FIGS. 4(a) and 4(b) within the sub 14. A circular hole, for example, hole 48, is cut through the side wall 140 of sub 14. An insert 142 which mates to the hole 48 includes a base/block unit 144, with the base block unit 144 providing for the support and electrical connection of the transducer to the driver electronics. The block 144 is designed to "float" with respect to the insert 142 to allow compensation for length changes, whether in the sub 14 or in the insert 142 due to tolerance stack up. As a result, the transducer can always be threadedly mounted to the floating base/block 144.

Figure 6:
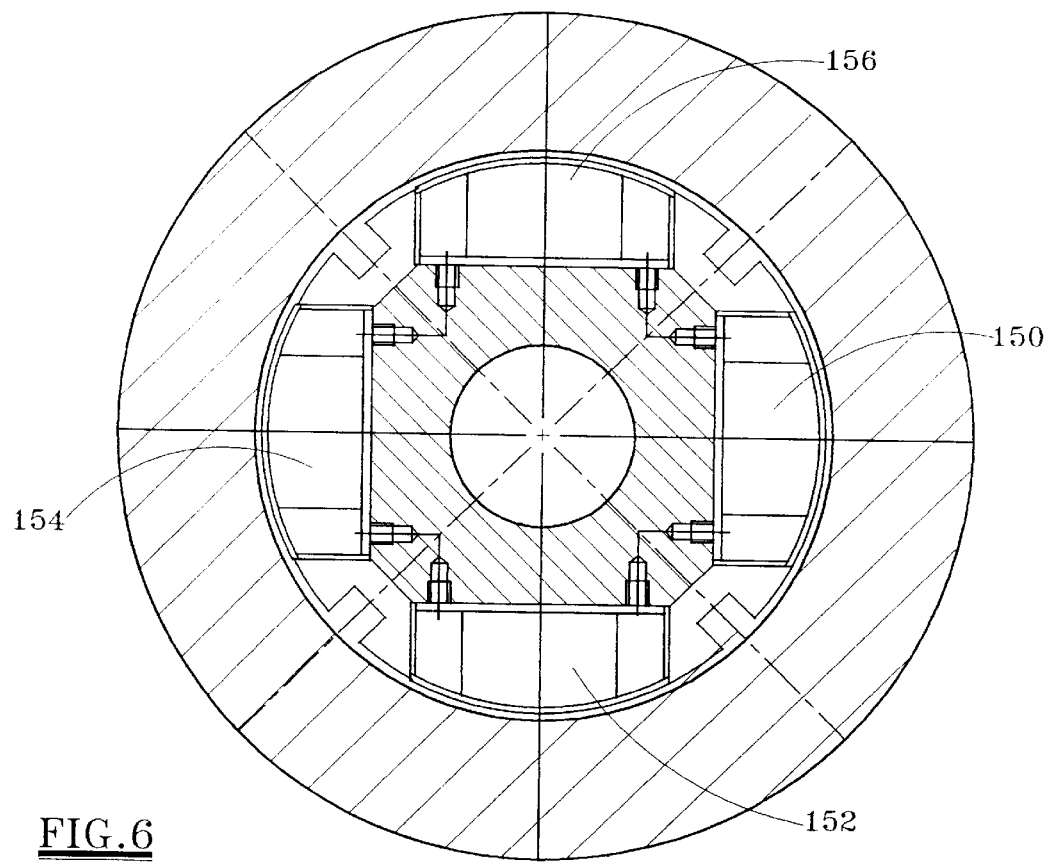
FIG. 6 is a cross-sectional view taken through the sub illustrated in FIG. 2 and taken along the sectional line 6-2.

Referring now to FIG. 6, which is a view taken along the sectional lines 6-2 of FIG. 2, there is illustrated the placement of up to four (4) electronic circuitry boards 150, 152, 154 and 156 that may be implemented in one of the preferred embodiments used to practice the present invention. At least one of the circuit boards, not illustrated, fitting in one of the cavities 150, 152, 154 and 156, includes at least one accelerometer 160 and at least one of the boards includes at least one magnetometer 162. It is preferable that the accelerometer and the magnetometer be included on the same board, and that one board be aligned axially with a particular transducer. For example, the transducer 60 can be axially aligned with an electronic board 154 containing both at least one accelerometer 160 and at least one magnetometer 162.

Figure 7:
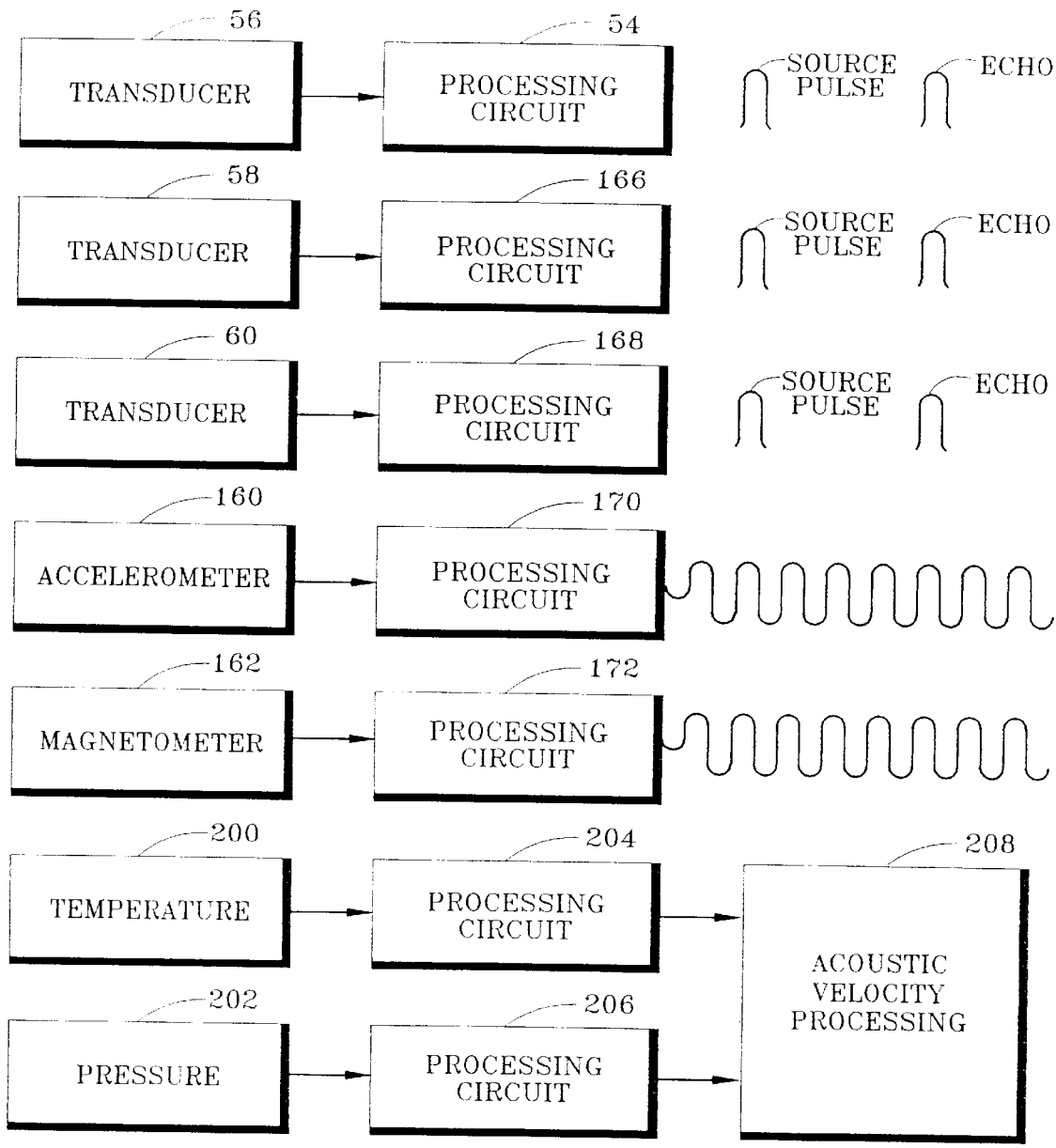
FIG. 7 is a block diagram illustrating the three transducers, an accelerometer and a magnetometer used in practicing the present invention.
Figure 8:
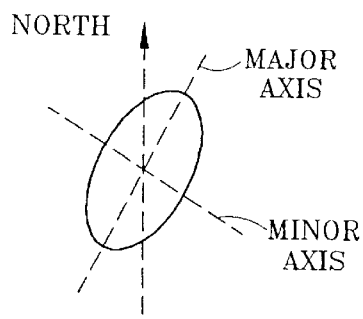
FIG. 8 is a diagrammatic view of an elliptical-shaped borehole having a major axis and a minor axis.

Referring now to FIGS. 7 and 8, there is described first in FIG. 7 a block diagram of the effect of using the three transducers 56, 58 and 60 in conjunction with at least one accelerometer 160 and at least one magnetometer 162 with the digital processing circuits 164, 166, 168, 170 and 172. When the borehole is being drilled in a circular pattern and for a centralized tool, the time between the source pulse and the return or echo from the borehole wall back to the transducers remains essentially the same for each of the three transducers. However, when the borehole becomes elliptical, as illustrated in FIG. 8, the processing circuits will plot the shape of the ellipse, but will not provide the directions of the major axis and of the minor axis with respect to Magnetic North. By also using an accelerometer and a magnetometer having known orientations with respect to one of the transducers, one can readily plot the direction of the major axis and of the minor axis with respect to Magnetic North or earth's gravity. As is illustrated in FIG. 7, the output of the magnetometer 162 as the sub 14 rotates with the drill string is a sine wave, with the peak signal being at Magnetic North, and the minimum signal being at Magnetic South. The output of the accelerometer 160 is also a sine wave having peaks coinciding with the earth's gravitational pull as the sub 14 rotates. However, because many horizontal wells are being drilled, it is important to have a tool which can measure the caliper of boreholes in horizontal wells, vertical wells, and all angles therebetween.

Also illustrated in FIG. 7 is a block diagram of a downhole temperature measurement sensor 200, a downhole pressure measurement sensor 202, and processing circuits 204 and 206, respectively, for the provision of "on-the-fly" corrections to the determinations of acoustic velocity in the Acoustic Velocity and Amplitude processing means 208.

It is important to recognize that an accelerometer will not function very well when the tool is nearly vertical. A magnetometer will not function very well if the angle of the tool is directly towards Magnetic North. By generating measurements taken by both the accelerometer 160 and the magnetometer 162, and as the drilled borehole takes on an elliptical shape through different angles or directions, one or the other of the accelerometer and the magnetometer will generally function well, and provide an indication of the direction of the major axis and of the minor axis of the ellipse, and thereby provide a major advantage for the calculation of stresses around the borehole.

Figure 9:
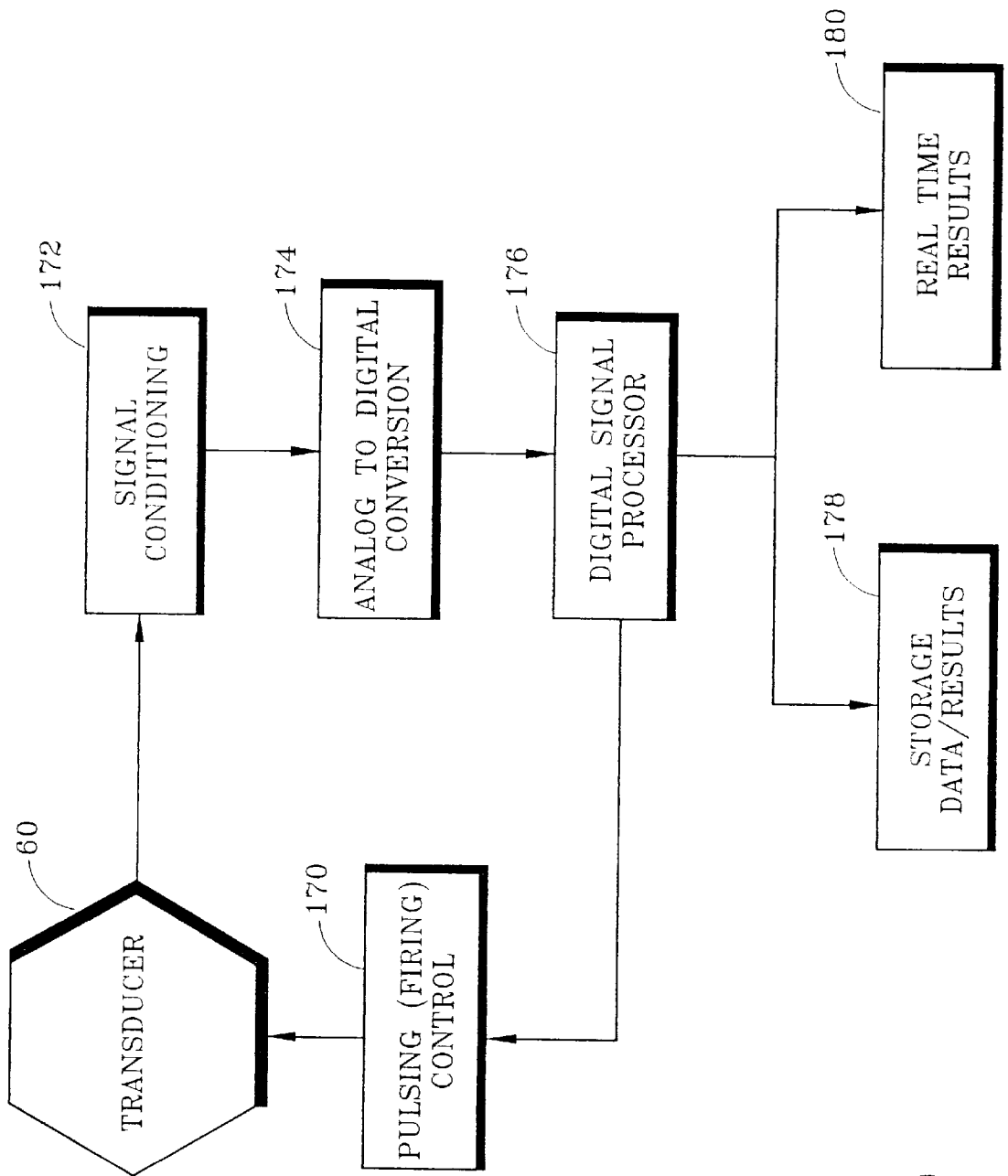
FIG. 9 is a block diagram of circuits used in practicing the present invention.

Referring now to FIG. 9, there is illustrated in block diagram the basic electronics of the system according to the invention. Although only transducer 60 is illustrated, identical circuits are used for each of the transducers 56 and 58. Although the expression "transducer" is used throughout this specification, each such transducer is actually a transceiver, because each is used to transmit the ultrasonic pulses and also to receive the pulses reflected from the borehole wall. The pulsing or firing of the transducer is controlled by the Pulsing (Firing) Control circuit 170, which triggers the ultrasonic element 74 illustrated in FIG. 4(a). The output of the ultrasonic element 74 passes through the drilling fluid to the borehole wall, where it is bounced back to the crystal 74 for processing. The return analog signal, sometimes referred to as an "echo," is then processed as required in the Signal Conditional Circuit 172, such as being amplified or filtered, and coupled into an Analog to Digital Conversion Circuit 174, the output of which is coupled into a Digital Signal Processor Circuit 176. The Digital Signal Processor Circuit 176 also sends a trigger signal to the Pulsing Control Circuit 170. The Digital Signal Processing circuit 176 processes the digitized waveforms with a multitude of techniques including but not limited to: filtering (simple or multirate); waveform mathematical manipulation (adding, subtracting, averaging etc.); waveform auto and cross-correlation; convolutions and deconvolutions; multiple waveform processing from one or may acquisitions from one or all of the transducers; signal decimation or up-sampling; and many others known to those skilled in the art. The input waveform to the Processor Circuit 176 is stored in a downhole recorder 178 for further processing at the earth's surface, if desired; the output results of the Processor Circuit 176 are stored in a downhole recorder 178 for further (re) processing at the earth's surface, if desired, and also may be used as inputs to a conventional mud pulse telemetry system (not illustrated), commonly referred to as MWD, for transmitting real time data to the earth's surface for processing in a conventional manner, such as in the conventional surface Data Processor System 190 illustrated in FIG. 1.

The Digital Signal Processor Circuit 176 provides various functions, including:

Processing the signal (from one or many acquisitions from one or many transducers) and then manipulating each individual pulse echo waveform, thus yielding an accurate representation of the actual echo signal minimizing the effects of the transmitter signal to the pulse-echo time and amplitude calculations. In contrast to the prior art, such methods allow for accurate echo arrival time and amplitude determination even in cases where the tool lies substantially against the borehole wall and thus the separation between the transmitted signal and the received signal is too small to be detected by analog threshold detection. In addition, since the signals can change with pressure and/or temperature the described technique is effectively an adaptive technique.

Processing the ultrasonic transducer ringing and then manipulating each individual received signal minimizing the effects of transducer ringing to the pulse-echo time and amplitude calculations. In contrast to the prior art, such a method allows for accurate echo arrival time and amplitude determinations even in cases where due to signal attenuation the signal to noise ratio is very small.

Processing the reflection noise from the imperfect backing material and then manipulating each individual received signal minimizing the effect of the backing material reflection noise to the pulse-echo time and amplitude calculation.

Utilizing standard techniques (digital filtering, correlation, convolution/deconvolution, up or down sampling of signals etc.) to substantially improve the accuracy of the determination of the arrival time and amplitude. In contrast to the prior art which is based on analog threshold detection, the current method yields a significantly more accurate determination of the arrival time and amplitude, thus significantly improving the accuracy of the standoff measurements used for borehole diameter, shape determination or imaging.

Figure 10A:
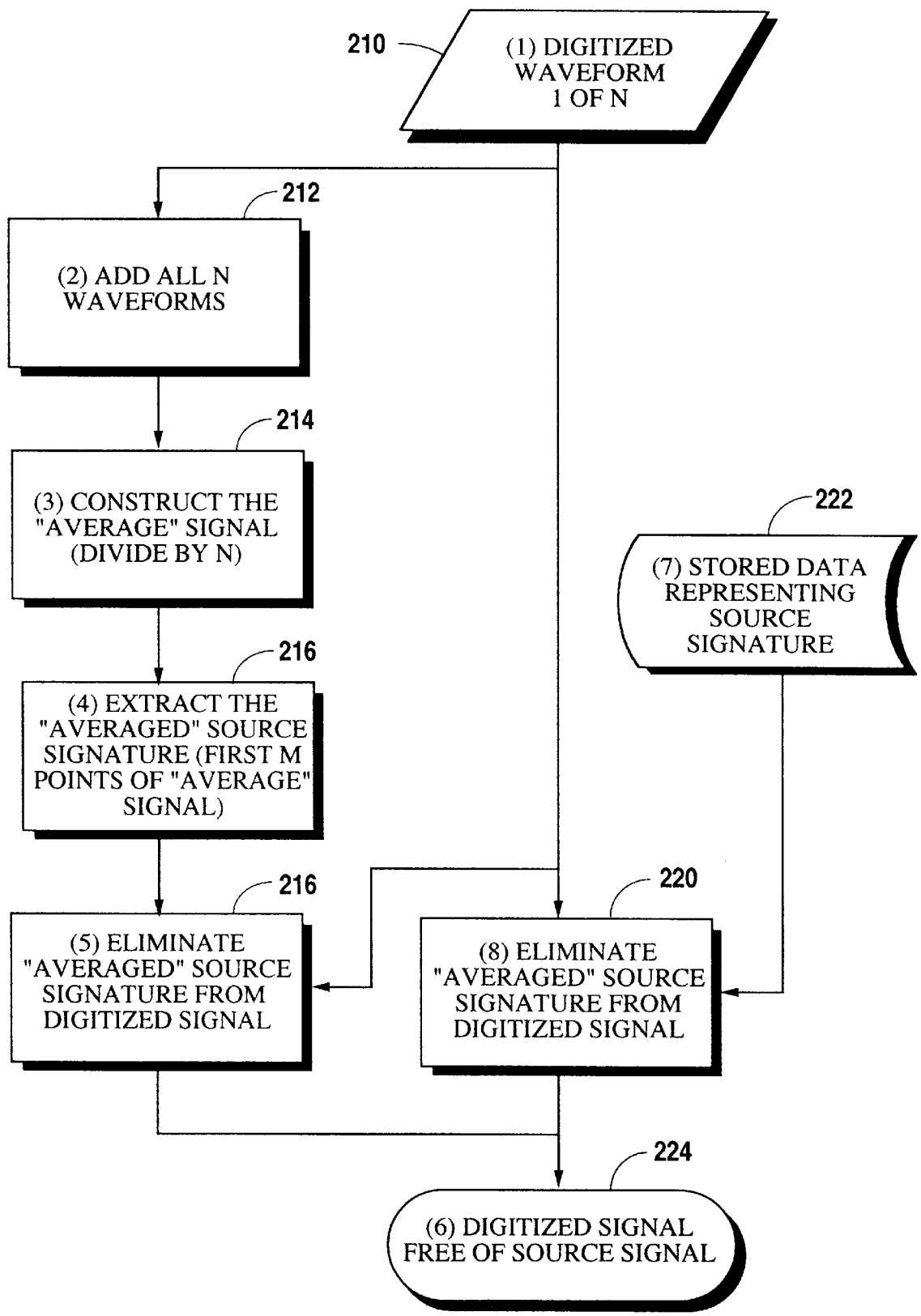
FIGS. 10A, B and C are flow charts illustrating the signal processing techniques in accord with the methods of the present invention.

Referring now to FIGS. 10A, B and C there are presented flow charts illustrating the signal processing meters in accordance with the present invention. In FIG. 10A there is illustrated an alternative method for elimination of the source signature from the received signal. In step 210 of FIG. 10A a received waveform of N number of waveforms is digitized. The N number of digitized waveforms are added in step 212. In step 214 the average signal is constructed by dividing the summed signal waveforms of step 212 by the number of waveforms N. In step 216 the average source signature (the first M points of the average signal, with M being a selected number) is extracted and in step 218 the average source signature and the digitized waveform of step 210 are combined to eliminate the averaged source signature from the digital signal. In the alternative, the digitized waveform of step 210 is combined in step 220 with 222, stored data representing the source signature, to eliminate the averaged source signature from the digitized signal. The result of either step 218 or step 220 yields, at 224, a digitized signal free of the source signal.

Figure 10B:
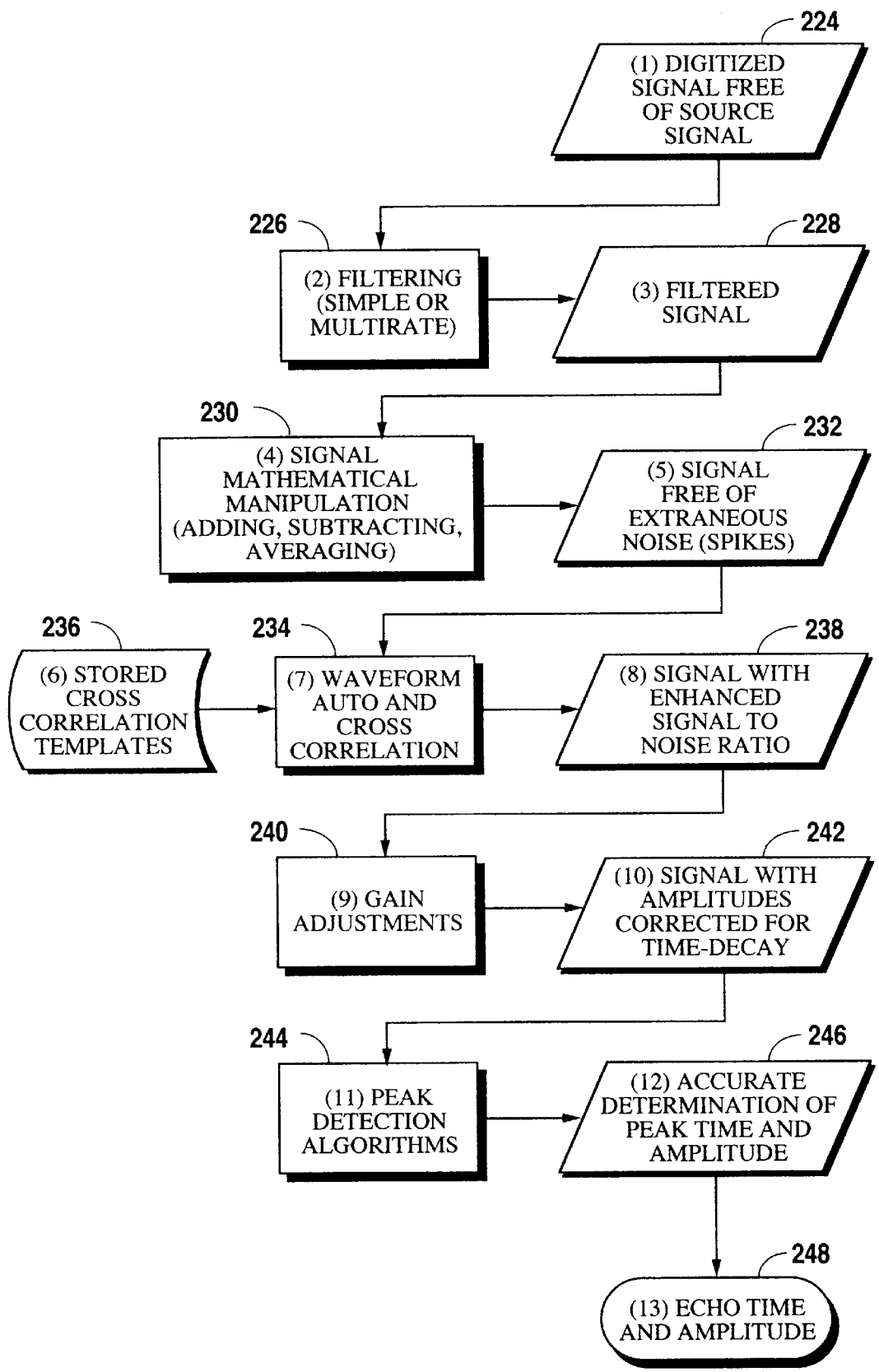

Referring now to FIG. 10B there are illustrated the signal manipulation methods of the signal processing of the present invention. In step 226 the digitized signal (free of the source signal), at 224, is filtered using simple or multirate filtering methods. The filtered signal, at 228, is subsequently subjected to signal manipulation known in the art, such as, for example, adding, subtracting and averaging, step 230, resulting in a signal free of extraneous noise, at 232. The signal, in step 234, is auto and cross correlated using stored cross correlation templates, at 236, providing a signal with enhanced signal to noise ratio, at 238. In step 240, the signal is gain adjusted and in step 242 the amplitudes are corrected for time decay. The corrected signal is submitted to peak detection in step 244, using peak detection algorithms known in the art. In step 246 an accurate determination is made of peak travel time and amplitude yielding an echo time and amplitude, at 248. These accurate determinations of echo time and amplitude contribute to higher resolution borehole wall or casing images when utilized in conjunction with standard imaging processors.

Figure 10C:
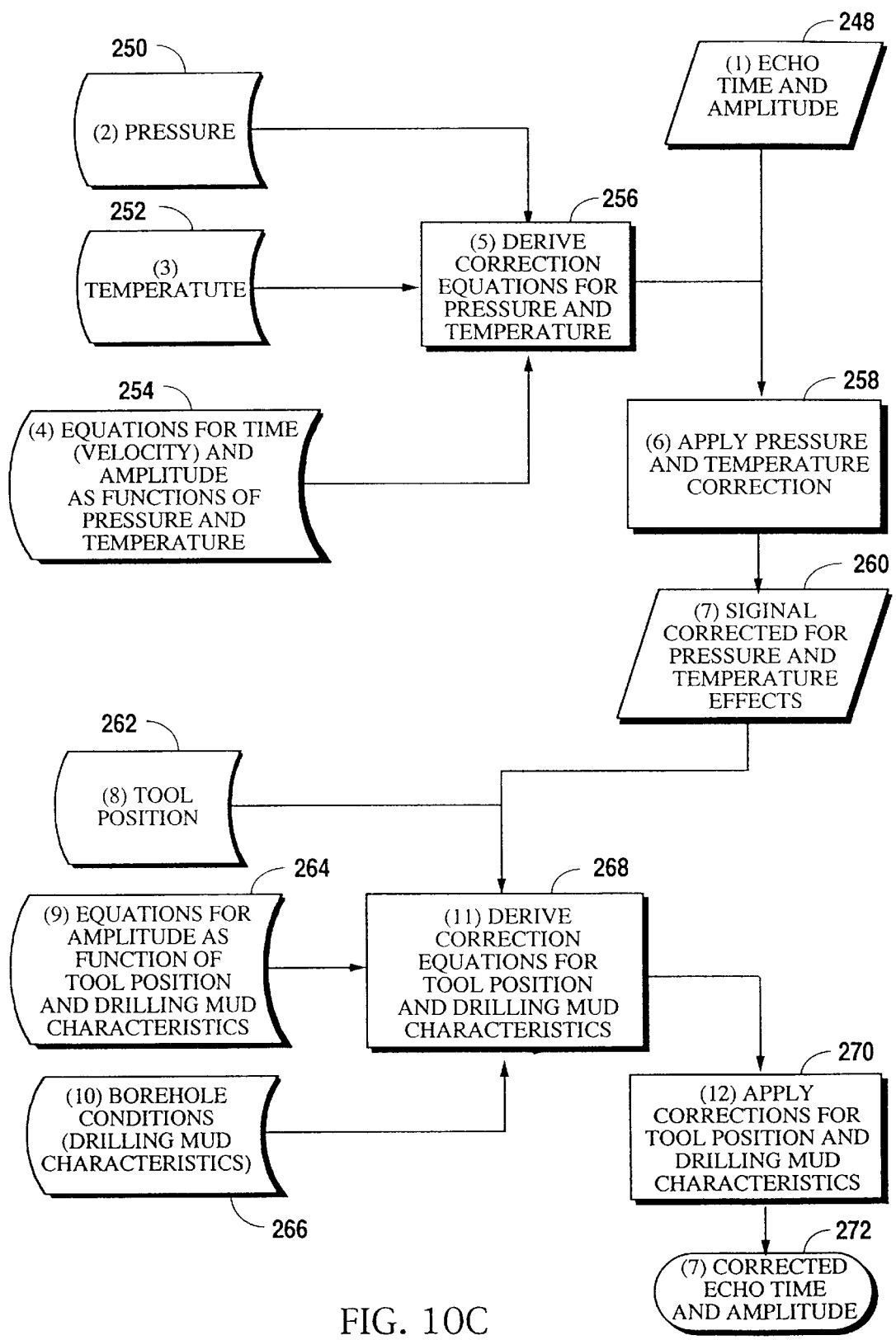

In addition to the foregoing description of the preferred embodiment of the present invention, the invention also contemplates the downhole measurement of the pressure and temperature of the drilling fluid (mud) column, and thus more accurate mud acoustic velocity can be determined while drilling, i.e., "on-the-fly," to correct the caliper measurements based upon such temperature and pressure measurements. Referring now to FIG. 10C there are illustrated the methods of signal correction for pressure, temperature and tool position. The measurement of pressure, at 250, and temperature, at 252, along with stored equations for velocity and amplitude as a function of pressure and temperature, at 254, are combined in step 256 to derive correction equations for measured pressure and temperature, which are applied in step 258 with the echo time and amplitude, from 248, resulting in a signal corrected for the effects of pressure and temperature, at 260. Tool position, from 262, is combined with the pressure and temperature corrected signal, along with equations for amplitude as a function of tool position and drilling mud characteristics, from 264, and borehole conditions (drilling mud characteristics), from 266, to derive correction equations for tool position and drilling mud characteristics, at step 268. In step 270 the corrections for tool position and drilling mud characteristics are applied to yield a corrected echo time and amplitude, at 272.

Here again, these further corrected echo time and amplitude valves contribute to higher resolution borehole wall or casing images when utilized in conjunction with standard imaging procedures. It should be appreciated that while the foregoing description of the preferred embodiment is primarily focused on acoustic caliper logging, most if not all of the features of the invention are equally applicable to the measurement of acoustic velocity in the formations themselves. In such an application the more accurate echo times and amplitudes provide a basis for the more accurate discrimination of formation characteristics as might be provided by acoustic formation imaging processors.

What is claimed is:

1. A method for creating an image of a borehole, comprising:

generating ultrasonic waves from a drill string in a borehole;

detecting in said drill string ultrasonic waves reflected from the borehole wall;

determining the amplitude of said reflected ultrasonic waves;

determining the temperature of fluid in said borehole in proximate location to the depth in said borehole at which said ultrasonic waves are generated;

determining the hydrostatic pressure in said borehole in proximate location to the depth in said borehole at which said ultrasonic waves are generated;

correcting the amplitude of said ultrasonic pulses passing through the borehole fluid as a function of said determined temperature and hydrostatic pressure of the borehole fluid as said drill string continues to drill deeper into said borehole; and creating an image of said borehole wall using the amplitude of said reflected ultrasonic waves.

2. A method for creating an image of a borehole, comprising:

generating ultrasonic waves from a plurality of ultrasonic transceivers positioned in a drill string in said borehole;

digitizing the transmitted ultrasonic wave from each of said transceivers;

detecting in each of said plurality of transceivers the ultrasonic waves reflected from the borehole wall;

digitizing in each of said plurality of transceivers the ultrasonic waves reflected from the borehole wall;

manipulating said digitized ultrasonic waves, thereby yielding a processed digitized echo wave substantially being an accurate representation of the actual echo signals reflected from the borehole wall;

determining the amplitude of the reflected wave from said processed digitized echo wave;

constructing a digitized waveform substantially corresponding to the ringing of said generated ultrasonic waves;

processing said digitized constructed waveform to thereby result in a processed digitized echo waves substantially free of the ringing effect of said generated ultrasonic waves;

determining the amplitude of said reflected ultrasonic wave from said processed digitized echo waves;

determining the temperature of fluid in said borehole in proximate location to the depth in said borehole at which said ultrasonic waves are generated;

determining the hydrostatic pressure in said borehole in proximate location to the depth in said borehole at which said ultrasonic waves are generated;

correcting the amplitude of said ultrasonic pulses passing through the borehole fluid as a function of said determined temperature and hydrostatic pressure of the borehole fluid as said drill string continues to drill deeper into said borehole; and creating an image of said borehole using said amplitude of said reflected waves.

* * * * *